United States Patent [19]

Strange

[11] 4,369,062

[45] Jan. 18, 1983

[54] METHOD OF MAKING BRIQUETTES AND PRODUCT

[76] Inventor: Robert R. Strange, 522 Lynnview Dr., Sagamore Hills, Ohio 44067

[21] Appl. No.: 306,296

[22] Filed: Sep. 28, 1981

[51] Int. Cl.³ .................... B22F 1/243; B22F 1/245; B22F 1/248; B22F 3/06

[52] U.S. Cl. .......................................... 75/256; 75/3; 264/117

[58] Field of Search .................. 264/111, 117, 122; 75/3-5, 25, 44 R, 44 S, 256

[56] References Cited

U.S. PATENT DOCUMENTS

| | | | |
|---|---|---|---|
| 3,316,083 | 4/1967 | Parsuns | 75/44 R |
| 3,807,986 | 4/1974 | Funk et al. | 75/44 S |
| 3,870,507 | 3/1975 | Allen | 75/25 |
| 4,004,918 | 1/1977 | Fukuoka et al. | 75/25 |
| 4,116,679 | 9/1978 | Pietsch | 75/3 |
| 4,336,218 | 6/1982 | Kaas et al. | 264/111 |

FOREIGN PATENT DOCUMENTS 2154955  5/1973  Fed. Rep. of Germany ............ 75/4

OTHER PUBLICATIONS

Merriman, A. D.; *A Dictionary of Metallurgy*, MacDonald & Evans, Ltd. London, p. 27, TN609.M47 (1958).

Powell, H. E., et al; "Experimental Metals Reclamation Process Recovers Alloys from Steel Mill Waste", Magazine, pp. 48-50 (4/75).

*Primary Examiner*—Michael L. Lewis
*Attorney, Agent, or Firm*—Hamilton, Renner & Kenner

[57] ABSTRACT

The method of making briquettes having approximately 50% metallic fines, 41% mill scale, 2% bentonite, 3% pitch residue, 2% burnt lime fines, and 2% molasses; and briquettes having that composition.

15 Claims, No Drawings

METHOD OF MAKING BRIQUETTES AND PRODUCT

TECHNICAL FIELD

The invention relates to making briquettes containing iron adapted for use as feed stock constituting part of the charge in steel-making furnaces. The briquettes contain large percentages of reclaimed mill waste and by-products such as mill scale, cast iron and steel borings and turnings, pitch residue and burnt lime fines.

BACKGROUND ART

Prior attempts of which I am aware to make briquettes utilizing reclaimed mill waste and by-products as feed stock have not been commercially acceptable for several reasons. Certain of these proposed briquettes have required the application of heat as well as pressure in the forming operation, thereby increasing labor and energy costs. Other proposed briquettes have been frangible and lacked adequate green strength, thereby fragmenting and dusting during handling.

DISCLOSURE OF THE INVENTION

The present invention provides for making briquettes from reclaimed materials, without the application of heat in the forming application, which have adequate green strength with high iron content.

It is an object of the present invention to provide an improved method of making iron-containing briquettes suitable for use as feed stock in combination with steel scrap in the steel making process.

Another object is to provide a novel briquette for that purpose having improved mechanical properties for handling.

A further object is to provide an improved method of making briquettes containing metal and oxide fines, combustible and binder materials, and fluxing materials such as burnt lime fines.

A still further object is to provide a novel and improved briquette which causes an exothermic reaction during the steel making process, thus supplying an additional source of energy for the reduction of iron oxide to metal.

Still another object is to provide a novel briquette containing reclaimed materials which when used with steel scrap in the furnace charge results in a substantial savings per net ton of iron in the charge.

These and other objects are accomplished by the improved method and novel product thereof comprising the present invention, a preferred embodiment of which is set forth herein as exemplifying the best known mode of carrying out the invention. Various modifications and changes in details of method and composition are comprehended within the scope of the appended claims.

PREFERRED EMBODIMENT FOR CARRYING OUT THE INVENTION

An exemplary formula of preferred reclaimed materials used in the improved briquettes of the present invention is as follows:

| | |
|---|---|
| metallic fines | 50% by weight |
| mill scale (oxide fines) | 41% |
| burnt lime fines | 2% |
| pitch residue | 3% |
| bentonite | 2% |
| molasses | 2% |
| | 100% |

These percentages may be varied somewhat depending upon variations in the characteristics of the ingredients.

The metallic fines may include steel and iron grinding dust, steel and iron turnings and iron borings. The sources of grinding dust are (1), baghouse collection of steel abrasive fines resulting from comminution of steel shot and grit during cleaning or etching of ferrous castings and wrought shapes; and (2), residue derived from mechanical grind scarfing and cutting of ingots, billets and blooms.

Steel turnings are normally long and stringy and must be shredded into fines suitable for blending and briquetting.

Iron turnings and borings of gray, malleable and ductile iron are normally saturated with water base soluble oil coolant used during the turning or boring operation. Substantially all of this water must be removed by draining, centrifuging, or both, as otherwise it will absorb part of the heat value of the combustibles in the briquette during melt down in the furnace. As much as 600 BTU is consumed per pound of water not removed.

Mill scale is iron oxide and is collected from scale breaking operations in the mechanical reduction of ingots to blooms or slabs, assisted by high pressure water jets which break up and wash the scale into collection pits, from which it is collected and piled for disposal and/or recycling. The scale when removed from the pits contains as much as 10% of water which must be reduced to at least 2–3% by run off, supplemented by centrifuging or thermal treatment if necessary, as excessive moisture may inhibit bonding of briquette materials as well as reducing heat value by absorption.

Burnt lime fines are the by-product of limestone calcining that is used for the development of refining slags in basic oxygen and electric furnace steel making. Limestone is calcined in normal mill operation and screened to remove 40 mesh and below, and these fractions are reclaimed for use in forming the improved briquettes.

Coal tar pitch residue is used to effect primary binding of the metallic and oxide fines and lime in the briquette, and is also a source of thermal energy during the melt down operation due to its carbon content. If the carbon content of the briquette mix is deficient, coke breeze screened from blast furnace coke to remove fines ⅛ inch and below may be used to supply additional carbon and as an added source of heat energy for aiding in chemically reducing iron oxides. Coke fines used in briquetting should be fines having a low moisture content.

Decanter sludge, which is a tar pitch residue from coke plant operations, may be used at least partially to supplant the coal tar pitch as it has much the same binding property although somewhat less carbon content and somewhat more moisture content.

The bentonite clay (aluminum silicate) is preferably western or sodium bentonite and is a porous colloidal clay which functions to distribute the particles of metallic fines and oxide fines, and also as a binder and moisture absorbent. Other porous colloidal clays may be used.

In the improved method of fabricating the novel briquettes, the given percentages of metallic and oxide fines are thoroughly mixed with the bentonite. Then the tar pitch is mixed in and the bentonite absorbs moisture from the tar pitch and increases adhesion of the particles of fines. Next, the molasses and lime are thoroughly mixed in, and they form a cement-like matrix with the metallic and oxide fines. It is very important to adhere to this sequence of mixing steps. Finally, the mixture is compressed into briquettes in a briquetting machine without heat. The form of the briquettes may be cylindric, with a diameter of about 4 inches and an axial length of approximately $4\frac{1}{4}$ to 5 inches.

The novel briquettes so fabricated have been demonstrated to have excellent green strength so as not to fragment or dust off during handling, and by analysis contain about 80% iron. They have been found by actual tests to satisfactorily and economically supply 30% of the total charge to an electric furnace wherein steel scrap constituent comprises 70%.

As shown in the following table, the briquettes contain 1,602 pounds of Fe per ton of briquettes.

TABLE I

| ASSUMPTION | |
|---|---|
| 1. Mill Scale: | At 72.4% Fe ($Fe_3O_4$) with 2.4% $H_2O$ with 6.0% Fe = 76.0% Net Fe. |
| 2. Steel Fines: | Dry at 97.7% Fe. |
| 3. Lime Fines: | CaO 94.96%; $SiO_2$-3.03%; $Fe_2O_3/Al_2O_3$-1.05%; MgO-0.93% |

| Material | % Fe | % Feed | # Feed/Ton Briquette | # Fe/Ton Briquette |
|---|---|---|---|---|
| Mill Scale | .76 | 41.0* | 820 | 624 |
| Steel Fines | .977 | 50.0 | 1000 | 978 |
| Lime | 0 | 2.0 | 40 | 0 |
| Binder | 0 | 4.0 | 80 | 0 |
| Pitch Residue | 0 | 3.0 | 60 | 0 |
| | | 100.0 | 2000 | 1602 |

$\frac{1602 \text{ \# Fe/T}}{2000 \text{ lbs.}} \times 100.00 = 80.1\%$ Iron

*Total weight of mill scale.

The carbon balance in the briquettes is shown in the following table:

TABLE II

| | Carbon Balance in Briquettes | | | |
|---|---|---|---|---|
| Material | % Chg. | # Material/T | % C | # Carbon/T |
| Steel Fines | 50.0 | 1000 | 1.00 | 10 |
| Mill Scale | 41.0 | 820 | 0 | 0 |
| Lime (Burnt) | 2.00 | 40 | 0 | 0 |
| Pitch Residue | 3.00 | 60 | 76.3 | 45.8 |
| Binder | 4.00 | 80 | 20.5 | 16.4 |
| (Bentonite 2% Molasses 2%) | | | | |
| | 100.00 | 2000 | | 72.2 |

% C = $\frac{72.2}{2000} \times 100$ = 3.62% C per ton of briquettes

While the initial reaction in the melt down of carbon and iron in forming CO is endothermic, as the CO burns with oxygen in the charge or in the atmosphere to form $CO_2$ the reaction is exothermic and generates 14,093 BTU per pound of material. From the above table the amount of carbon per ton of briquette material is 72.2 pounds. Hence the heat value available due to carbon is 72.2 × 14,093 = 1,017,515 BTU per ton.

The heat value available due to the exothermic reaction of hydrogen and oxygen in forming $H_2O$ generates 60,991 BTU per pound of material. The pitch residue in the briquette material contains about 5.68% of hydrogen. From the above table there is 60 pounds of pitch residue per ton of material. 0.0568 × 60 = 3.41 pounds of hydrogen per ton. Hence 3.41 × 60.991 BTU = 207,979 BTU per ton, and the total heat value per ton of material is 207,979 + 1,017,515 = 1,225,494 BTU per ton of briquettes.

The following table shows a preferred furnace charge ratio of steel scrap and briquettes.

TABLE III

| | Furnace Charge Using Low Carbon Steel Scrap/Ton of Steel | | | | |
|---|---|---|---|---|---|
| Material | Fe Charge Ratio | % Fe | % Feed | # Feed/ Ton Steel | # Fe in Feed/ Ton of Hot Steel |
| Scrap | 70 | .90 | 67.5 | 1580 | 1422 |
| Briquettes | 30 | .80 | 32.5 | 760 | 608 |
| | 100 | | 100.0 | 2340 | 2030 |

90.00% Fe in #1 Scrap is based on 2.25% other elements, 2.00 moisture, 1.00 oxide ($O_2$) and 4.75 non-metallics
Slag Fe loss factor is 11.0# per ton of hot steel
Other Fe losses are not included in this comparison The percentage ratio of scrap and briquettes used in the feed is adjusted to 67.5% and 32.5% is adjusted to compensate for a deficiency of iron in the scrap. The 2,340 pounds of feed per ton of steel includes make-up additions to compensate for losses during melt down.

The material and labor costs of briquetting are as follows:

TABLE IV

| Raw Material and Economic Balance | | | |
|---|---|---|---|
| Material | $/Ton | %-Mix | $/Charge |
| Mill Scale | 15.00 | 41.00 | 6.15 |
| Metallic Fines | 30.00 | 50.00 | 15.00 |
| Lime Fines (Burnt) | 25.00 | 2.00 | .50 |
| Decanter Sludge | 50.00 | 3.00 | 1.50 |
| Binder | 150.00 | 4.00 | 6.00 |
| | | | 29.15/Ton |

$\frac{29.15}{0.801}$ = $36.39/Ton Contained Iron

| Material Costs | $29.15/Ton |
|---|---|
| Estimated Briquetting-Handling-Freight Costs | 31.50/Ton |
| Delivered Costs | $60.65/Ton(Net) |

The net savings as a result of using the novel briquettes are as follows:

TABLE V

| Comparison of Not Ton Cost of Fe- #1 Scrap Versus Briquettes | | |
|---|---|---|
| | #1 Scrap | Briquettes |
| Net Ton | $80.36 | $60.65 |
| Net Ton Fe | $89.29 | $75.72 |
| Differential = 89.29−75.72 = | $13.57 Net Ton Fe | |
| Lime Savings = | 1.00 Net Ton Fe | |
| Net Savings per Ton Fe = with Briquettes | $14.57 Net Ton Fe | |

Accordingly, the improved method of making briquettes of a novel combination of reclaimed materials provides briquettes having adequate green strength and high iron content suitable for comprising 30% to 70% ratio with steel scrap furnace charge, and provides increased heat value and substantial cost savings per net ton of iron.

I claim:

1. The method of making briquettes adapted for use as feed stock in steel making furnaces, comprising forming a compressed mass by the steps of mixing metallic fines and metallic oxide fines in an amount of about 91% by weight of the total mass with about 2% of porous colloidal clay, then thoroughly mixing in about 3% of pitch residue, then mixing in about 2% of burnt lime fines and about 2% of molasses, and then cold compressing the mixture into briquettes, said metallic fines comprising about 50% of steel and iron fines and said oxide fines comprising about 41% of mill scale.

2. The method as described in claim 1, wherein the porous colloidal clay comprises western bentonite.

3. The method as described in claim 2, wherein the pitch residue is coal tar pitch.

4. The method as described in claim 2, wherein the pitch residue is decanter sludge.

5. The method as described in claim 1, wherein the porous colloidal clay is western bentonite.

6. The method as described in claim 5, wherein the pitch residue is coal tar pitch.

7. The method as described in claim 5, wherein the pitch residue is decanter sludge.

8. A briquette adapted for use as feed stock in steelmaking furnaces, comprising about 50% by weight of steel and iron fines, about 41% of mill scale, about 2% porous colloidal clay, about 3% pitch residue, about 2% burnt lime fines, and about 2% molasses.

9. A briquette as defined in claim 8, wherein the porous clay is western bentonite.

10. A briquette as defined in claim 9, wherein the pitch residue is coal tar pitch.

11. A briquette as defined in claim 9, wherein the pitch residue is decanter sludge.

12. A briquette as defined in claim 8, wherein the pitch residue is coal tar pitch.

13. A briquette as defined in claim 8, wherein the pitch is decanter sludge.

14. A briquette adapted for use as feed stock in steelmaking furnaces, comprising about 50% by weight of steel and iron fines, about 41% of mill scale, about 2% porous colloidal clay, about 3% pitch residue containing coke breeze, about 2% burnt lime fines, and about 2% molasses.

15. A briquette as defined in claim 14, wherein the porous clay is western bentonite.

* * * * *